(12) United States Patent
Pakala et al.

(10) Patent No.: US 9,064,507 B1
(45) Date of Patent: Jun. 23, 2015

(54) MAGNETIC ETCH-STOP LAYER FOR MAGNETORESISTIVE READ HEADS

(71) Applicant: Western Digital (Fremont), LLC, Fremont, CA (US)

(72) Inventors: Mahendra Pakala, Fremont, CA (US); Rongfu Xiao, Dublin, CA (US); Chando Park, Irvine, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/088,320

(22) Filed: Nov. 22, 2013

Related U.S. Application Data

(62) Division of application No. 12/534,091, filed on Jul. 31, 2009, now Pat. No. 8,611,055.

(51) Int. Cl.
*G11B 5/39* (2006.01)
*G11B 5/11* (2006.01)

(52) U.S. Cl.
CPC .............. *G11B 5/11* (2013.01); *G11B 5/3929* (2013.01); *G11B 5/3909* (2013.01); *G11B 5/3912* (2013.01)

(58) Field of Classification Search
CPC ...... G11B 5/39; G11B 5/3903; G11B 5/3906; G11B 5/3909; G11B 5/3912; G11B 5/3929; G11B 2005/3996
USPC ............ 360/319, 320, 324.1, 324.11, 324.12, 360/324.2, 324
See application file for complete search history.

(56) References Cited

U.S. PATENT DOCUMENTS

| | | |
|---|---|---|
| 5,587,026 A | 12/1996 | Iwasaki et al. |
| 5,731,936 A | 3/1998 | Lee et al. |
| 5,796,560 A | 8/1998 | Saito et al. |
| 5,955,211 A | 9/1999 | Maeda et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |

(Continued)

OTHER PUBLICATIONS

Office Action dated Aug. 21, 2012 from U.S. Appl. No. 12/534,091, 19 pages.
Notice of Allowance dated Aug. 19, 2013 from U.S. Appl. No. 12/534,091, 8 pages.

*Primary Examiner* — Jefferson Evans

(57) ABSTRACT

A tunneling magnetoresistive read head produced thereby are disclosed. A shield layer is provided. A magnetic etch-stop layer is formed over the shield layer, where the magnetic etch-stop layer comprises a nonmagnetic metal and a soft magnetic material with overall property still being magnetically soft. A sensor stack is formed over the magnetic etch-stop layer. A patterned mask layer is formed over the sensor stack. Material from a portion of the sensor stack not covered by the patterned mask is removed.

12 Claims, 5 Drawing Sheets

(56) References Cited

U.S. PATENT DOCUMENTS

| | | |
|---|---|---|
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,278,592 B1 | 8/2001 | Xue et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,476 B1 | 6/2002 | Lin et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,560,078 B1 | 5/2003 | Pinarbasi |
| 6,577,470 B1 | 6/2003 | Rumpler |
| 6,583,961 B2 | 6/2003 | Levi et al. |
| 6,583,968 B1 | 6/2003 | Scura et al. |
| 6,592,725 B2 | 7/2003 | Lin et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,788,499 B2 | 9/2004 | Lin et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,961,224 B2 | 11/2005 | Pinarbasi |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,993,827 B2 | 2/2006 | Horng et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,060,194 B2 | 6/2006 | Kodaira et al. |
| 7,067,331 B2 | 6/2006 | Slaughter et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,111,385 B2 | 9/2006 | Chau et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,352,543 B2 | 4/2008 | Li et al. |
| 7,354,664 B1 | 4/2008 | Jiang et al. |
| 7,355,823 B2 | 4/2008 | Li et al. |
| 7,363,697 B1 | 4/2008 | Dunn et al. |
| 7,367,109 B2 | 5/2008 | Li et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,382,587 B2 | 6/2008 | Pinarbasi |
| 7,386,933 B1 | 6/2008 | Krounbi et al. |
| 7,389,577 B1 | 6/2008 | Shang et al. |
| 7,417,832 B1 | 8/2008 | Erickson et al. |

(56) References Cited

U.S. PATENT DOCUMENTS

| | | |
|---|---|---|
| 7,419,891 B1 | 9/2008 | Chen et al. |
| 7,420,788 B2 | 9/2008 | Pinarbasi |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,476,954 B2 | 1/2009 | Wang et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |

(56) References Cited

U.S. PATENT DOCUMENTS

| | | |
|---|---|---|
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,437,105 B2 * | 5/2013 | Vas'ko et al. .................. 360/319 |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 2002/0015268 A1 | 2/2002 | Mao et al. |
| 2002/0023338 A1 | 2/2002 | Seigler et al. |
| 2004/0214049 A1 | 10/2004 | Yamamoto et al. |
| 2007/0030724 A1 | 2/2007 | Hosomi et al. |
| 2007/0063237 A1 | 3/2007 | Huai et al. |
| 2007/0111332 A1 * | 5/2007 | Zhao et al. .................. 438/3 |
| 2007/0146928 A1 | 6/2007 | Zhang et al. |
| 2007/0206335 A1 | 9/2007 | Freitag et al. |
| 2008/0080101 A1 * | 4/2008 | Mauri et al. ................ 360/324.2 |
| 2008/0090307 A1 | 4/2008 | Xiao et al. |
| 2008/0213628 A1 | 9/2008 | Hailu et al. |
| 2009/0323228 A1 * | 12/2009 | Carey et al. .................. 360/319 |
| 2010/0290157 A1 | 11/2010 | Zhang et al. |
| 2011/0086240 A1 | 4/2011 | Xiang et al. |
| 2011/0100953 A1 * | 5/2011 | Tanaka et al. .................. 216/22 |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

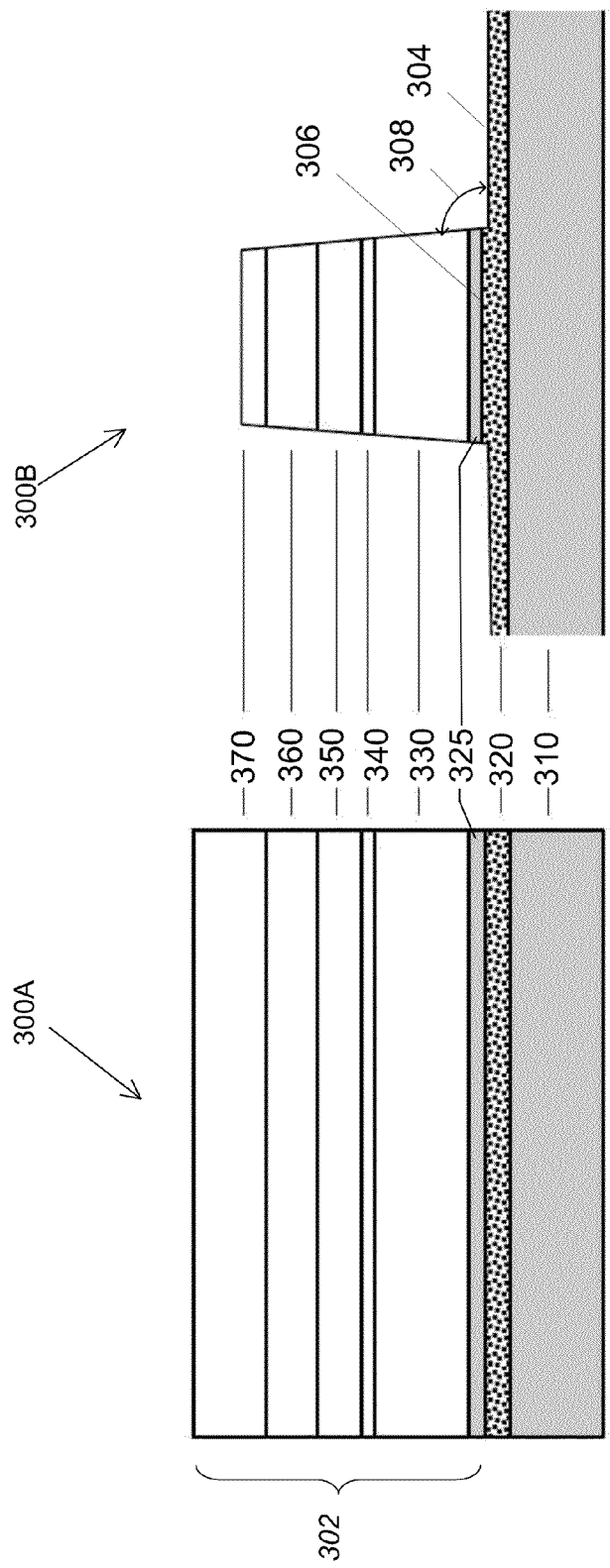

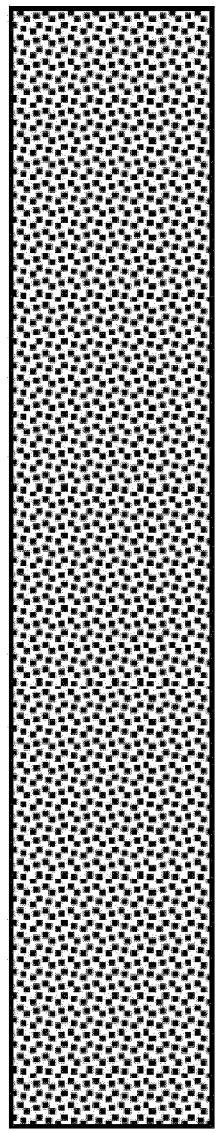
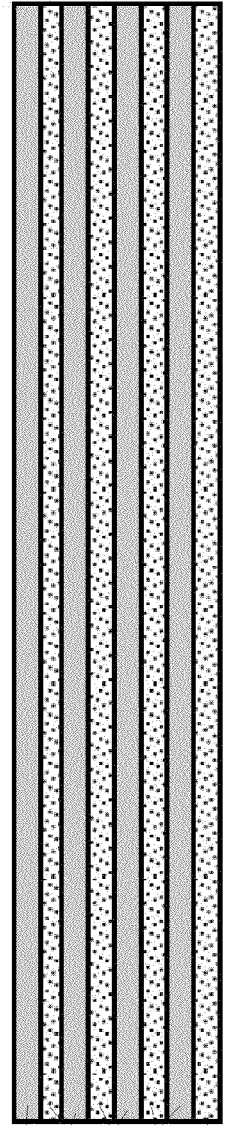

MAGNETIC ETCH-STOP LAYER FOR MAGNETORESISTIVE READ HEADS

REFERENCE TO RELATED APPLICATIONS

This application is a divisional of U.S. patent application Ser. No. 12/534,091, filed Jul. 31, 2009, the content of which is incorporated herein by reference in its entirety.

FIELD OF THE INVENTION

The present invention generally relates to magnetoresistive read heads and, in particular, relates to magnetic etch-stop layer for magnetoresistive read heads.

BACKGROUND OF THE INVENTION

Magnetoresistive sensors such as tunnel magnetoresistance (TMR) sensors and giant magnetoresistance (GMR) sensors are frequently employed as sensing elements in the magnetic read heads of hard disk drives. As the areal density of hard disks approaches 1 Tb/in$^2$, the size of read head shrinks in all three dimensions: track width (TW), shield-to-shield spacing, and stripe height. In current fabrication processes for magnetic read heads, an ion-beam-etch (IBE) process is used to define the track width. In general, fabrication of a contiguous junction (CJ) involves etching out the CPP sensor (TMR or GMR) by the IBE process to designed TW and junction angle. Subsequently, a thin insulator and permanent magnetic film are deposited along the TW direction to stabilize the sensor. For a robust product performance, the TW dimension as well as the sidewall (junction) angle sigmas have to be tightly controlled.

In current fabrication processes, TW and junction angle sigmas are relatively large. One contributing factor for these variations is the beam steering/divergence associated with the IBE process. Another important contributing factor is the stability of the photoresist used for patterning. Another approach involves using a reactive ion etch (RIE) process used to get junction profiles without the in-board/outboard asymmetry normally associated with the IBE processes and their characteristic beam steering/divergence. The use of the RIE process can significantly reduce the junction angle sigma compared with the IBE process. Also, the TW sigma is expected to be reduced due to the use of tantalum (Ta) hard mask instead of a photoresist.

Recently, a new magnetic RIE process has been introduced that is specifically aimed at etching of magnetic multilayer structures. In this RIE process, an etch-stop layer 120 made of pure Ta with a thickness greater than 30 Å is put at the bottom of a sensor stack (comprising a bottom sensor layer 130, a barrier layer 140, free layers 150, 160, and a capping layer 170) in order to achieve a flat etching profile as shown in FIG. 1A.

However, the shield-to-shield spacing is reduced, the current AFM seed layer used in MgO TMR sensors is changed to CoFeB/NiFe magnetic seed layer, which is not effective as RIE etch-stop layer when using CH$_3$OH etchant gas, for example. This gives rise to the formation of skirts 105 at the bottom of the sensor stack as shown in FIG. 1B. The formation of the skirts 105 is not desirable, as they hamper a good alignment between the free layer of the sensor and the hard bias used for stabilization.

SUMMARY OF THE INVENTION

Various embodiments of the subject disclosure overcome the foregoing limitations by providing a novel magnetic etch-stop layer having a soft magnetic property and yet acting as an effective etch-stop layer. As will become evident from the subject disclosure, the use of such a magnetic etch-stop layer has a number of advantages including reducing the shield-to-shield spacing, reducing TW and junction angle sigmas, and providing an effective etch-stop layer for RIE process.

According to one embodiment of the subject disclosure, a method of producing a magnetoresistive read head is disclosed. The method can comprise providing a shield layer. The method can further comprise forming a magnetic etch-stop layer over the shield layer. The magnetic etch-stop layer can comprise a nonmagnetic metal and a soft magnetic material. The method can further comprise forming a sensor stack over the magnetic etch-stop layer. The method can further comprise forming a patterned mask layer over the sensor stack. The method can further comprise removing material from a portion of the sensor stack not covered by the patterned mask.

According to one embodiment of the subject disclosure, a tunneling magnetoresistive read head is disclosed. The tunneling magnetoresistive read head can comprise a shield layer. The tunneling magnetoresistive read head can further comprise a magnetic etch-stop layer disposed over the shield layer, the magnetic etch-stop layer comprising a nonmagnetic metal and a soft magnetic material. The tunneling magnetoresistive read head can further comprise a patterned sensor stack disposed over the magnetic etch-stop layer.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

FIG. 3A is a diagram depicting an exemplary pre-etch TMR structure according to one aspect of the subject disclosure.

FIG. 3B is a diagram depicting an exemplary post-etch TMR structure according to one aspect of the subject disclosure.

FIG. 4A is a diagram depicting an exemplary alloyed magnetic etch-stop layer according to one aspect of the subject disclosure.

FIG. 4B is a diagram depicting an exemplary multilayered magnetic etch-stop layer according to one aspect of the subject disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figures 1, 1A, 1B:
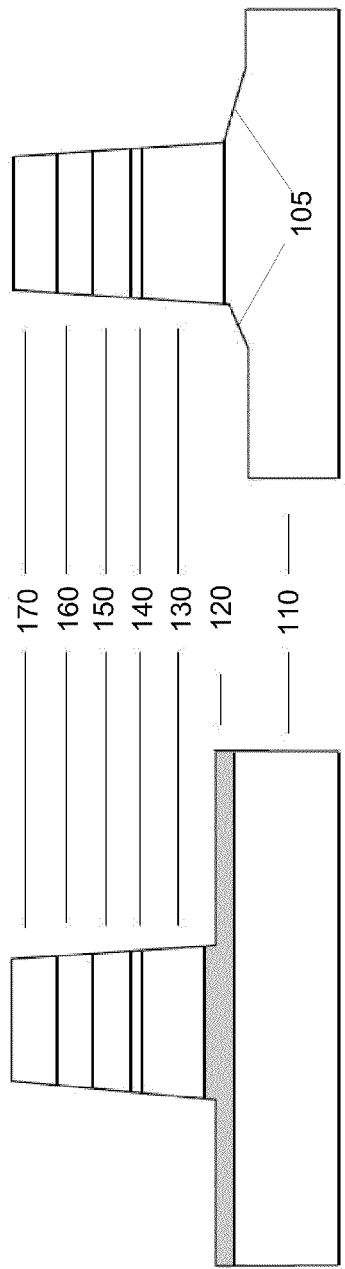
FIG. 1A is a diagram depicting a prior art TMR sensor structure produced via an RIE process using Ta as the etch-stop layer.
FIG. 1B is a diagram depicting a prior art TMR sensor structure produced via an RIE process using a magnetic seed layer such as CoFeB/NiFe as the etch-stop layer.
Figure 2:
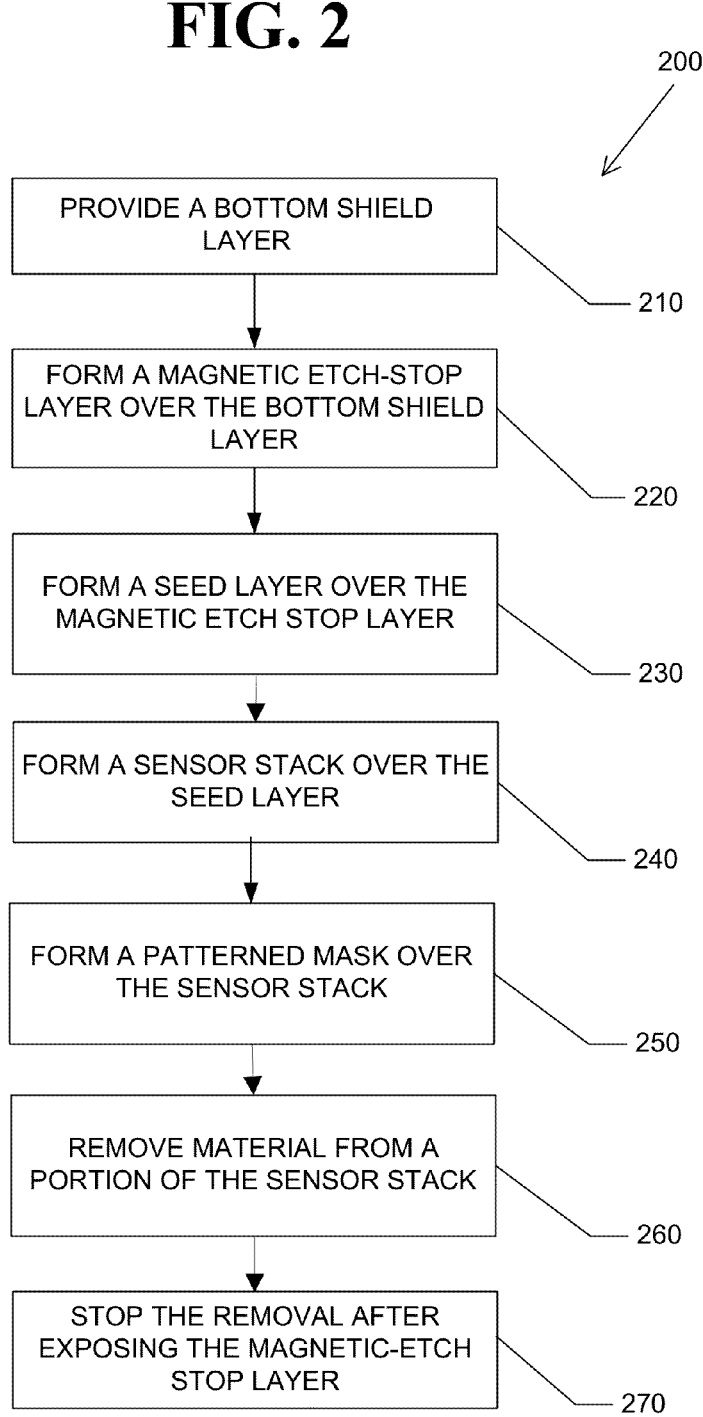
FIG. 2 is a flowchart illustrating an exemplary process for producing magnetoresistive sensors (e.g., TMR or GMR sensors) by the use of a magnetic etch-stop layer according to one aspect of the subject disclosure.

FIG. 2 is a flowchart illustrating an exemplary process 200 for producing magnetoresistive sensors (e.g., TMR or GMR sensors) using a magnetic etch-stop layer according to one aspect of the subject disclosure. The process 200 will be described with respect to exemplary pre-etch and post-etch TMR sensor structures 300A, 300B before and after RIE etching process, respectively, as shown in FIGS. 3A and 3B. The TMR sensor structures 300A and 300B comprise a bottom shield layer 310, a magnetic etch-stop layer 320 disposed over the bottom shield layer 310, a seed layer 325 disposed over the magnetic etch-stop layer 320, and a sensor stack 302 disposed over the seed layer 325. In certain embodiments, the seed layer 325 is configured to be magnetic to ensure a narrow shield-to-shield magnetic spacing. The sensor stack 302 comprises a bottom sensor layer 330, a barrier layer 340, a first free layer 350 and a second free layer 360, and a capping layer 370. In certain embodiments, the bottom sensor layer 330 can comprise a plurality of magnetic layers including a pinning or antiferromagnetic (AFM) layer, a reference layer, and/or a pinned layer.

It shall be appreciated by those skilled in the art in view of the subject disclosure that references to various elements of the TMR sensor structures 300A and 300B are for illustration purposes only, and various embodiments and methodologies of the subject disclosure can be applied to other types of TMR or other magnetoresistive sensor structures. For example, although FIGS. 3A and B depict a current-perpendicular-to plane (CPP) TMR head, those skilled in the art will understand that various embodiments and methodologies of the subject disclosure can be applied to CPP GMR, current-confined path (CCP) GMR devices, or to multilayer sensor designs based on any other magnetoresistance (MR) effect.

The process 200 begins at operation 210, in which the bottom shield layer 310 is provided. The bottom shield layer 310 comprises a soft magnetic material such as NiFe permalloy.

The process 200 proceeds to operation 220, in which the magnetic etch-stop layer 320 is formed over the bottom-shield layer 310. As indicated above, the magnetic etch-stop layer 320 has a soft-magnetic property (e.g., having a magnetic permeability greater than 7000) and is also effective as an RIE etch-stop layer having an etching selectivity with respect to a seed layer material. In certain embodiments, the magnetic etch-stop layer 320 comprises a nonmagnetic metal that provides the etching selectivity and a soft magnetic material that provides the soft magnetic property for the etch-stop layer. In some embodiments, the magnetic etch-stop layer 320 comprises an amorphous soft magnetic material to prevent any effect of S1 shield from transferring to the structure of the crystalline magnetic seed layer formed thereon.

FIGS. 4A and 4B show two exemplary embodiments of magnetic etch-stop layer: an alloyed magnetic etch-stop layer 320A and a multilayered magnetic etch-stop layer 320B. The alloyed magnetic etch-stop layer 320A comprises an alloy or a mixture of at least one nonmagnetic metal and at least one soft magnetic material. The soft magnetic metal can comprise one or more of cobalt (Co), nickel (Ni), and iron (Fe). In certain embodiments, the nonmagnetic metal is Ta, and the soft magnetic material comprises an alloy of cobalt iron boron (CoFeB). However, the nonmagnetic metal can comprise one or more of other heavy metals such as chromium (Cr) and zirconium (Zr) in place of or in addition to Ta, and the soft magnetic material can comprise one or more of other soft magnetic materials including, but not limited to Ni, Fe, NiFe, and CoFe, in place of or in addition to CoFeB. In some embodiments, the alloyed magnetic etch-stop layer may be CoFeTa, NiFeTa, CoFeCr, NiFeCr, CoFeZr, or NiFeZr. In certain embodiments, the nonmagnetic metal comprises between about 10 to about 40 weight percent of the alloyed magnetic etch-stop layer 320A. Preferably, the nonmagnetic metal comprises between about 10 to about 25 weight % of the alloyed magnetic etch-stop layer.

The multilayered magnetic etch-stop layer 320B (FIG. 4) comprises a set of alternating layers of a nonmagnetic metal 322B and a soft magnetic material 344B. In certain embodiments, the nonmagnetic metal 322B is Ta, and the soft magnetic material 344B is CoFeB. In other embodiments, one or more of other heavy metals such Cr and Zr can be used in place of or in addition to Ta, and one or more of other soft magnetic materials including, but not limited to, Ni, Fe, NiFe, and CoFe, can be used in place of or in addition to CoFeB. In one particular embodiment, the multilayered magnetic etch-stop layer 320B constitutes a multilayer [CoFe/Ta]×N, where N is the number of CoFeTa layer combinations and can range from 2 to 10.

In certain embodiments, the nonmagnetic metal comprises between about 10 to about 40 weight percent of the multilayered magnetic etch-stop layer 320B. Preferably, the nonmagnetic metal comprises between about 10 to about 25 weight percent of the multilayered magnetic etch-stop layer 320B. In some embodiments, each of the layers comprising the nonmagnetic metal 322B has a thickness of between about 2 Å to about 8 Å. Where the magnetic etch-stop layer 320 employed is a multilayered magnetic etch-stop layer (e.g., 320B of FIG. 4B), the operation 220 includes alternating depositions of the nonmagnetic metal and the soft magnetic material. The deposition of the nonmagnetic metal can be performed, for example, by physical vapor deposition (PVD) process. The deposition of the soft magnetic material can be performed, for example, by PVD.

The process 200 proceeds to operation 230, in which the seed layer 325 is formed over the magnetic etch-stop layer 320 (FIG. 3). As indicated above, in certain embodiments, the seed layer 325 is configured to be magnetic. The magnetic seed layer 325 can comprise NiFe, CoFe, CoFe/NiFe and can have a thickness in the range of 20-100 Å. In certain embodiments, the magnetic seed material has a crystalline structure.

The process 200 proceeds to operation 240, in which the sensor stack 302 is formed over the seed layer 325 to arrive at the pre-etch TMR sensor structure 300A. In the illustrated example, as indicated above, the sensor stack 302 comprises the bottom sensor layer 330, the barrier layer 340, the first free layer 350, the second free layer 360, and the capping layer 370. In certain embodiments, the bottom sensor layer 330 comprises an pinning or antiferromagnetic (AFM) layer, a reference layer disposed over the AFM layer, and a pinned layer disposed over the reference layer. In some embodiments, the barrier layer 340 comprises a crystalline magnesium oxide (MgO). In addition, although not shown in FIGS. 3A and B, the crystalline MgO tunnel barrier 340 can include a thin Mg or Zn layer between the bottom sensor layer 330 and the MgO in the barrier layer 340. The capping layer 370 can be formed of materials such as Ta, Ru, Ta/Ru, Ru/Ta, Ta/Ru/Ta or Ru/Ta/Ru. In some embodiments, the first free layer 350 includes an alloy of cobalt and iron (CoFe), and the second free layer 360 includes an alloy of nickel and iron (NiFe).

In certain embodiments, a thin (e.g., 10 Å) non-magnetic metal such as Ru (not shown) is inserted between an AFM material disposed at the bottom of the bottom sensor layer 330 and the magnetic seed layer 325 to provide a magnetic isolation therebetween. Methods of depositions for various layers of the sensor stack 302 are known in the art and not repeated here for the sake of brevity.

The process 200 proceeds to operation 250, in which a patterned mask is formed over the pre-etch TMR structure 300A (FIG. 3). This can be accomplished, for example, by depositing and patterning a bottom anti-reflection coating (BARC) and photoresist over the sensor stack 302. Alternatively, a hard metal such as Ta can be deposited underneath the BARC and photoresist and patterned to form a patterned hard mask.

The process 200 proceeds to operation 260, in which material from a portion of the sensor stack 302 is removed by an etching process. The removal operation, for example, can remove the portion not covered by the patterned mask. In certain embodiments, the etching process is a reactive ion etching (RIE) process. The RIE process can employ an etchant gas including, but not limited to, $CH_3OH$, $C_2H_5OH$ or $CO/NH_3$. Alternatively, a two-step etching process is performed, by first etching the BARC and Ta using a fluorine containing gas, such as $CF_4$ or $CHF_3$, followed by magnetic layer etching using $CH_3OH$ as etchant gas.

The process 200 proceeds to and ends after operation 270, in which the removal operation begun at the operation 260 is stopped after exposing the magnetic etch-stop layer 320 to arrive at the post-etch TMR structure 300B shown in FIG. 3B. As illustrated by the TMR structure 300B, the RIE process is stopped after removing a top portion of exposed portion 304 of the magnetic etch stop layer 320, making the exposed portion 304 slightly (e.g., 30 Å) below unexposed portion 306 of the magnetic etch-stop layer 320. The exposed portion 304 of the magnetic etch stop layer 320 remains with the TMR sensor structure as part of the bottom shield owing to its soft magnetic property. Furthermore, the resulting TMR structure 300B can have a junction angle 308 in the range of between about 50 to about 90 degrees. Due to the flatness (e.g., lack of skirts) of the exposed portion 304, a low sigma value for the junction angle 308 can be achieved.

It shall be appreciated by those skilled in the art in view of the subject disclosure that various compositions and arrangements for the magnetic etch-stop layer 320 can be advantageously employed to provide an etching selectivity over a material comprising the seed layer 325. For example, Table 1 shows experimentally-determined selectivity data for certain magnetic etch-stop layers (1 and 2) and a nonmagnetic etch-stop layer (3) with respect to certain proposed seed layer materials.

TABLE 1

| Etch-stop layer | Etching Rate [Å/min] | Selectivity to IrMn, CoFeB | Selectivity to NiFe |
| --- | --- | --- | --- |
| 1 [CoFeB(3Å)/Ta(2Å)] × 10 | 46 | ~4 | ~10 |
| 2 [CoFeB(12Å)/Ta(2Å)] × 10 | 84 | 1.5 | ~5 |
| 3 Ta(50Å) | 30 | ~4 | ~15 |

For example, the magnetic etch-stop layer 1 comprising a stack of 10 repeated CoFeB(3 Å)/Ta(2 Å) layer combinations provides an etching selectivity almost as high as the conventional nonmagnetic etch-stop layer Ta and yet possesses a soft magnetic property that allows the magnetic etch-stop layer to become part of the bottom shield, thereby reducing the overall shield-to-shield spacing for the TMR sensor.

Figures 5A, 5B:
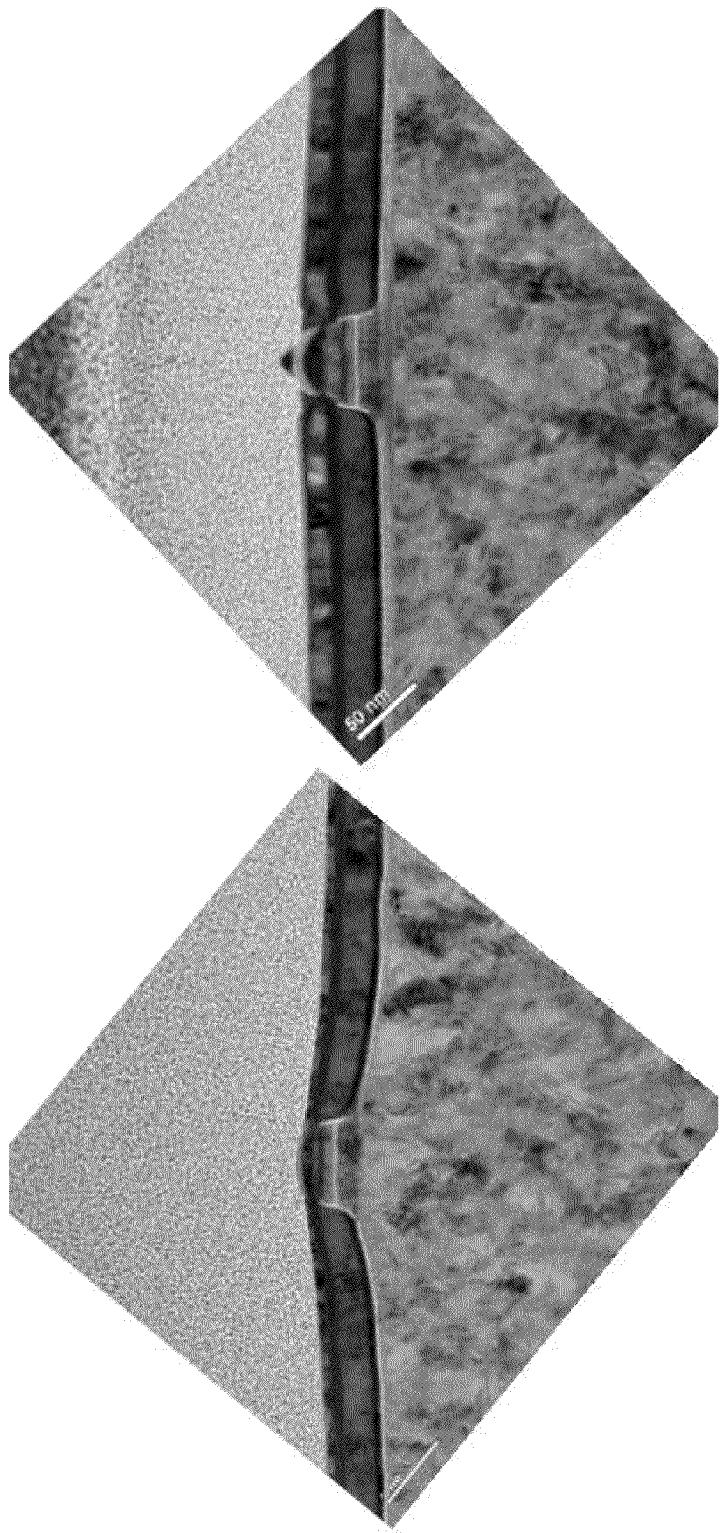
FIG. 5A is a TEM image of a post-etch TMR structure produced via RIE process using a conventional magnetic seed layer acting as an etch-stop layer.
FIG. 5B is a TEM image of a post-etch TMR structure produced via RIE process using a multilayered magnetic etch-stop layer according to one aspect of the subject disclosure.

FIG. 5A is a tunneling electron microscope (TEM) image of a post-etch TMR structure produced via RIE process using a conventional magnetic seed layer acting as an etch-stop layer. FIG. 5B is a TEM image of a post-etch TMR structure produced via RIE process using a multilayered magnetic etch-stop layer (e.g., the magnetic etch-stop layer 1 of Table 1) according to one aspect of the subject disclosure. A comparison of TEM images of FIGS. 5A and 5B demonstrates that the use of the magnetic etch-stop layer of the subject disclosure reduces or eliminates skirts that would have been formed at the outside bottom of the TMR junction if conventional magnetic seed layer were used. The use of the magnetic etch-stop layer according to the subject disclosure also helps to achieve a superior TW and junction angle sigmas. Additionally, the use of the magnetic etch-stop layer according to the subject disclosure also helps to achieve a narrower overall shield-to-shield spacing by the fact that the etch-stop layer can become a part of the bottom shield by the virtue of the layer having a soft magnetic property.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:
1. A tunneling magnetoresistive read head comprising:
a shield layer;
a magnetic etch-stop layer disposed over the shield layer, the magnetic etch-stop layer comprising a nonmagnetic metal and a soft magnetic material, wherein the magnetic etch-stop layer comprises an alloy of the nonmagnetic metal and the soft magnetic material; and
a patterned sensor stack disposed over the magnetic etch-stop layer.

2. The tunneling magnetoresistive read head of claim 1, wherein the patterned sensor stack comprises a plurality of magnetic layers.

3. The tunneling magnetoresistive read head of claim 2, wherein the plurality of magnetic layers comprise a first magnetic layer comprising an antiferromagnetic material.

4. The tunneling magnetoresistive read head of claim 3, further comprising a patterned magnetic seed layer disposed between the magnetic etch-stop layer and the first magnetic layer.

5. The tunneling magnetoresistive read head of claim 4, further comprising an isolation layer comprising a nonmagnetic metal, the isolation layer disposed between the patterned magnetic seed layer and the first magnetic layer, the isolation layer configured to provide a magnetic isolation between the magnetic etch-stop layer and the first magnetic layer.

6. The tunneling magnetoresistive read head of claim 4, wherein the magnetic seed layer comprises an alloy of iridium and manganese (IrMn), an alloy of cobalt, iron, and boron (CoFeB), or an alloy of nickel and iron (NiFe).

7. The tunneling magnetoresistive read head of claim 4, wherein a composition of the nonmagnetic metal and the soft magnetic material provides the magnetic etch-stop layer an etching selectivity of at least 1.5 with respect to a material comprising the magnetic seed layer.

8. The tunneling magnetoresistive read head of claim 4, wherein a composition of the nonmagnetic metal and the soft magnetic material provides the magnetic etch-stop layer an etching selectivity of at least 5 with respect to a material comprising the magnetic seed layer.

9. The tunneling magnetoresistive read head of claim 1, wherein the nonmagnetic metal comprises Ta, Cr, or Zr.

10. The tunneling magnetoresistive read head of claim 1, wherein the soft magnetic material comprises one or more of cobalt (Co), nickel (Ni), and iron (Fe).

11. The tunneling magnetoresistive read head of claim 1, wherein the alloy is CoFeTa, NiFeTa, CoFeCr, NiFeCr, CoFeZr, or NiFeZr.

12. The tunneling magnetoresistive read head of claim 1, wherein the magnetic etch-stop layer comprises a set of alternating layers of the nonmagnetic metal and the soft magnetic material.

* * * * *